United States Patent
Pinter et al.

(10) Patent No.: US 7,247,673 B2
(45) Date of Patent: Jul. 24, 2007

(54) WATERBASED HIGH ABRASION RESISTANT COATING

(75) Inventors: Michael W. Pinter, Chesterfield, MI (US); Marufur Rahim, Fort Gratiot, MI (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 514 days.

(21) Appl. No.: 10/783,315

(22) Filed: Feb. 20, 2004

(65) Prior Publication Data
US 2005/0192391 A1 Sep. 1, 2005

(51) Int. Cl.
*C08L 83/04* (2006.01)
*B32B 9/04* (2006.01)

(52) U.S. Cl. ............... 524/588; 525/100; 525/101; 525/453; 525/455; 528/25; 528/27; 528/28; 524/404; 524/428

(58) Field of Classification Search .......... None
See application file for complete search history.

(56) References Cited

U.S. PATENT DOCUMENTS

| 3,423,377 A | 1/1969 | Tennenhouse |
| 5,322,600 A | 6/1994 | Spitz et al. |
| 5,427,698 A | 6/1995 | Hirokawa et al. |
| 5,567,353 A * | 10/1996 | Bogan, Jr. .......... 516/89 |
| 5,783,308 A | 7/1998 | Leendersen |
| 6,610,777 B1 * | 8/2003 | Anderson et al. ........ 524/588 |
| 2003/0073779 A1 * | 4/2003 | Tamori et al. .......... 524/588 |

FOREIGN PATENT DOCUMENTS

| EP | 0 737 656 | 10/1996 |
| JP | 58065767 | 4/1983 |
| JP | 58109542 A | 6/1983 |
| JP | 60141779 | 7/1985 |
| JP | 03020466 B | 3/1991 |
| JP | 03021339 | 3/1991 |
| JP | 05051557 | 2/1993 |
| JP | 8048800 | 2/1996 |
| JP | 11034809 | 2/1999 |

* cited by examiner

*Primary Examiner*—Marc S. Zimmer
(74) *Attorney, Agent, or Firm*—Charles W. Almer

(57) ABSTRACT

A coating for weatherstrips, windshield wipers, door seals, trunk seals, sunroof seals, windshield seals and the like. The coating comprises a water-based formula that provides high abrasion resistance and, optimally, also provides excellent weathering resistance. The abrasion resistance property is achieved via a combination of boron nitride and a high molecular weight silicone resin. Flexibility and weathering resistance are achieved via the addition of an acrylic/polyurethane/fluoropolymer resin binder blend and high UV-stabilizers and absorbers. Also provided is a method of manufacturing such coatings that comprises the steps of pre-dispersing the boron nitride in water and then combining the pre-dispersed boron nitride with the silicone resin and other ingredients.

36 Claims, No Drawings

WATERBASED HIGH ABRASION RESISTANT COATING

FIELD OF THE INVENTION

The present invention relates to a waterbased high abrasion coating that provides excellent abrasion resistance and weathering properties in weatherstripping, windshield wiper blades and similar applications.

BACKGROUND OF THE INVENTION

Solvent based weather strip materials have been constructed with silicone resin for many years. Various ingredients, including boron nitride, have been added to these materials to produce the desired result of a long-lasting, quiet and abrasion-resistant coating. Many of these coatings have been manufactured using solvents that contain a high percentage of volatile organic compounds (VOC). The VOC content of coatings is strictly monitored and controlled in the United States by the Environmental Protection Agency and is also a concern in many other countries. Health hazards are also a concern of manufacturers and users of coatings containing solvent in that the coatings are often used in open spray booths that could easily contaminate workers. Accordingly, manufacturers have sometimes restricted the use of isocyanate-based two component coatings. Such restrictions, however, provide a great deal of difficulty to the industry in that there is no existing method of manufacturing a stable water-based coating containing boron nitride.

It would be advantageous to develop a water-based coating for use in weatherstrips, windshield wipers and the like that would perform as well as existing solvent-based coatings. Such a coating must provide high abrasion resistance, high weather resistance, good ice release characteristics and low noise. The coating must be capable of application on thermoplastic olefin compounds (TPO), thermoplastic vulcanate compounds (TPV) and ethylene-propylene-diene-terpolymers (EPDM) via spray, brush or dip and drag processes. It would also be advantageous to develop a method of manufacturing such a water-based coating.

SUMMARY OF THE INVENTION

The present invention concerns a coating for weatherstrips, windshield wipers, door seals, trunk seals, sunroof seals, windshield seals and the like. The coating comprises a water-based formula that provides high abrasion resistance and, optimally, also provides excellent weathering resistance. The abrasion resistance property is achieved via a combination of boron nitride and a high molecular weight silicone resin. Flexibility and weathering resistance are achieved via the blends of three different types of resin: acrylic, polyurethane and fluoropolymer. The invention also provides for a method of manufacturing such coatings that comprises the steps of pre-dispersing the boron nitride in water and then combining the pre-dispersed boron nitride with the silicone resin and other ingredients.

DETAILED DESCRIPTION OF THE PREFERRED EMBODIMENTS

The present invention describes a water-based coating having both high abrasion and weathering resistance for use in weatherstrips, windshield wipers, outer belts and the like. Coatings such as those of the present invention that provide high abrasion resistance can also act to eliminate flock for glass channel run. The coatings of the present invention are achieved via a combination of a pre-dispersion of boron nitride and silicone resin combined with a blend of resins and other optionally additional ingredients.

A coating having a high abrasion resistance is obtained via a combination of boron nitride and silicone resin. The boron nitride is in the form of a white powder having a specific gravity of between 1.5 and 2.5 and a melting point in the range of about 3000 F. The boron nitride is preferably in the form of a cubic or hexagonal crystalline structure. Most preferably, the boron nitride is in the form of a hexagonal crystalline structure. The particle size of the boron nitride preferably is between 0.1 micron and 50 micron. Most preferably, the particle size of the boron nitride is in the range of between 1 and 20 microns. Numerous grades of boron nitride are commercially available from companies including Advance Ceramics and Saint Gobain Advanced Ceramics.

The silicone resin component of the coating preferably has a high molecular weight in the range of about 1,000 to about 800,000 with a viscosity in the range of about 15,000 cps to about 700,000 cps. A blend of silicone resins having different molecular weights may be utilized. One such blend would have three silicone resins having molecular weights in the ranges of about 1,000 to about 2,500, about 5,000 to about 20,000 and about 400,000 to about 800,000. High molecular weight silicone resins that may be utilized for this purpose include polydimethoxysiloxane which is commercially available from Dow Corning, Shin-Etsu Chemical, GE Silicones, Wacker Silicone and Goldschmidt Chemical Corporation.

A second important desired characteristic of weatherstripping is high weather resistance. This property is obtained via the addition of resin binders that enhance the weather resistance of the weatherstrip. Without the above-listed resin binders, a boron nitride/silicone resin composition would provide good abrasion and low noise properties, but poor appearance/weathering properties. The resin binders are preferably in a three component blend of acrylic, polyurethane, and fluoropolymer and are ultraviolet stable. Preferred resins are styrene acrylic, aliphatic polyester polyurethane and fluorinated (Fluoro Ethylene-Alkyl Vinyl Ether) alternative copolymers or fluorinated acrylic copolymers. Various ratios of the three resins will provide weathering benefits, however a ratio of acrylic:polyurethane:fluoropolymer in the range of about 1:1:1 to about 1:5:10 is preferred.

Acrylic resin suitable for the coating of the invention is commercially available from Engineered Polymer Solutions, Inc. as EPS, Reichhold as Arolon and EM, Avecia as NeoCryl and Noveon under the tradenames CARBOSET and HYCAR. Polyurethane is commercially available from Alberdingk Boley Inc. as Alberdingk, Reichhold as Spensol and Spenlite, Avecia as NeoRez and Noveon as Sancure. High UV stabilizers and absorbers also provide weathering resistance. Among the high UV stabilizers and absorbers that may be included in the resin binders are TINUVIN, commercially available from Ciba Specialty Chemicals Corp. and CHISORB, commercially available from Chitec.

Additional additives provide the desired benefits of good ice release and low noise. The ice release benefit is provided by the silicone resin in combination with the fluoropolymer. The ability of the weatherstrip to reduce noise is also provided by the silicone resin, preferably in combination with fluoropolymer and most preferably in combination with polyamide. Further additives, such as curing agents, wetting agents, catalysts, amines, co-solvents, and cross linkers, may also be added as desired. Useful curing agents and cross linkers include, but are not limited to, carbodiimide, epoxy silane, epoxy, melamine, oxazoline, polyisocyanate, polyaziridine, isocyanate, blocked isocyanate, aziridine, melamine-formaldehyde and urea formaldehyde or mixtures thereof. When utilized, the additional additives comprise in the range of about 1 wt % to about 40 wt % of the coating and preferably in the range of about 1 wt % to about 25 wt % of the coating.

The final liquid coating contains in the range of about 0.1 wt % boron nitride to about 20 wt % boron nitride, and preferably from about 0.5 wt % to about 5 wt % boron nitride. The final liquid coating contains in the range of about 1 wt % to about 40 wt % silicone resin and most preferably in the range of about 8 wt % to about 20 wt % silicone resin. The final liquid coating contains in the range of about 4 wt % to about 30 wt % of the resin binder and most preferably in the range of about 4 wt % to about 20 wt % of the resin binder.

The coating is preferably manufactured as a suspension with little coagulation so that it may easily and uniformly be applied via spray, brush and dip and drag applications. In order to form a stable boron nitride-containing coating suspension it is necessary to first make a pre-dispersion containing the boron nitride. A one-step combination of boron nitride and the other coating ingredients does not produce a satisfactory water-based coating. The pre-dispersion preferably contains boron nitride along with water, preferably de-ionized water. Some additives, such as dispersion agents, rheology modifiers and amines may also be added to the pre-dispersion. To complete the coating, the remaining desired ingredients are added to the pre-dispersion. After the addition of the silicone resin, resin binder and other desired ingredients, the coating is crosslinked before it is applied.

The invention may be further described by the following non-limiting example.

EXAMPLE

Two water-based boron nitride coatings were formed. Formulation A was formed via the following method: De-ionized water and boron nitride were combined along with a dispersing agent, rheology modifier, amine and a preservative in the proportions shown in Table 1.

TABLE 1

| Predispersion | |
|---|---|
| Material | Weight % |
| De-ionized water | 84.30 |
| Boron nitride | 13.00 |
| Dispersing Agent | 1.00 |
| Rheology Modifier | 1.55 |
| Amine | 0.05 |
| Preservative | 0.10 |

All of the ingredients listed in Table 1, except about 5% of the de-ionized water, were charged into a pebble mill suitable for white products. The mill was run for 16 hours and the solids were adjusted with the remaining de-ionized water as needed in order to form a pre-dispersion. The pre-dispersion was then placed in a different container and the organic solvents and UV materials were added to the pre-dispersion. After mixing the mixture slowly for five minutes, additional ingredients including acrylic binder, polyurethane binder, fluoropolymer, high molecular weight silicone resin, water, a wetting agent, a UV package, polyamide, carbon black, amine, co-solvents and chlorinated polyol, crosslinking agent and catalyst were added over a two-hour period. The composition was thoroughly mixed and the pH was increased to about 9-10 by adding ammonia. The final composition was filtered through a 200-mesh screen into a container. Formulation B was made by the same steps but without the use of a pre-dispersion of boron nitride, crosslinking agent, catalyst or high molecular weight silicone resin and with a rheology modifier, fluorosurfactant and low molecular weight silicon resin. Formulation B can be used as an appearance coating which does not require any performance properties other than good weathering, which is provided by the resin blends.

The formulations were tested for various properties. The results of the tests are shown in Table 2.

TABLE 2

| Properties of Coatings | | |
|---|---|---|
| Property | A | B |
| 3 kg Glass Chisel Abrasion Resistance | 30,000 Cycles | 1,000 Cycles |
| Weathering (SAE J1960 Exterior Cycle) | 2500 kJoules | ≧2500 kJoules |

As shown in Table 2, the coating containing the boron nitride pre-dispersion and high molecular weight silicone resin produced abrasion resistance better than the formula without boron nitride and with a low molecular weight silicone resin.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A high abrasion and weather resistant water-based coating comprising boron nitride, silicone resin, a resin binder, and at least one crosslinking agent, wherein the resin binder comprises a blend of acrylic resin, polyurethane resin, and fluoropolymer.

2. The coating of claim 1, further comprising at least one high UV stabilizer, high UV absorber or mixtures thereof.

3. The coating of claim 1 wherein the at least one resin binder comprises a blend of styrene acrylic, aliphatic polyester polyurethane, and Fluoro Ethylene-Alkyl Vinyl Ether.

4. The coating of claim 1, wherein the ratio of acrylic resin to polyurethane resin to fluoropolymer is in the range of about 1:1:1 to about 1:5:10.

5. The coating of claim 1 further comprising one or more of the group comprising dispersing agents, rheology modifiers, amines, preservatives, wetting agents, co-solvents, carbon black, polyamide, chlorinated polyol, catalysts, and mixtures thereof.

6. The coating of claim 5, further comprising one or more of the group comprising epoxy, epoxy silane, carbodiimide, melamine, oxazoline, polyisocyanate, isocyanate, blocked isocyanate, aziridine, melamine-formaldehyde, polyaziridine, urea formaldehyde or mixtures thereof.

7. The coating of claim 1, wherein the silicone resin comprises a blend of silicone resins having different molecular weight ranges.

8. The coating of claim 1, wherein the silicone resin is polydimethoxysiloxane.

9. The coating of claim 1, wherein the coating comprises in the range of from about 0.1 wt % to about 20 wt % boron nitride.

10. The coating of claim 9 wherein the coating comprises in the range of about 0.5 to about 5 wt % boron nitride.

11. The coating of claim 1, wherein the coating comprises in the range of about 1 wt % to about 40 wt % silicone resin.

12. The coating of claim 11, wherein the coating comprises in the range of about 8 wt % to about 20 wt % silicone resin.

13. The coating of claim 1, wherein the coating comprises in the range of about 4 wt % to about 30 wt % of the at least one resin binder.

14. The coating of claim 13, wherein the coating comprises in the range of about 4 wt % to about 20 wt % of the at least one resin binder.

15. An article coated with the coating of claim 1.

16. The article of claim 15, wherein the article comprises a weatherstrip, windshield wiper or automotive seal.

17. A flock replacement coating for glass run comprising the coating of claim 1.

18. An appearance coating for an outer belt comprising the coating of claim 1.

19. A method of producing a high abrasion and weather resistant coating comprising:
   (a) forming a pre-dispersion containing boron nitride and water; and
   (b) adding silicone resin and at least one resin binder and at least one cross-linking agent to the pre-dispersion, wherein the resin binder comprises a blend of arcylic resin polyurethane resin, and fluoropolymer.

20. The method of claim 19, further comprising at least one high UV stabilizer, high UV absorber or mixture thereof.

21. The method of claim 19 wherein the at least one resin binder comprises a blend of styrene acrylic, aliphatic polyester polyurethane, and Fluoro Ethylene-Alkyl Vinyl Ether.

22. The method of claim 19, wherein the ratio of acrylic resin to polyurethane resin to fluoropolymer is in the range of about 1:1:1 to about 1:5:10.

23. The method of claim 19, further comprising the step of adding one or more of the group comprising dispersing agents, rheology modifiers, amines, preservatives, wetting agents, co-solvents, carbon black, polyamide, chlorinated polyol, catalysts, and mixtures thereof.

24. The method of claim 23, further comprising the step of adding one or more of the group comprising epoxy, epoxy silane, carbodiimide, melamine, oxazoline, polyisocyanate, isocyanate, blocked isocyanate, aziridine, melamine-formaldehyde, polyaziridine, urea formaldehyde or mixtures thereof.

25. The method of claim 19, wherein the silicone resin comprises a blend of silicone resins having different molecular weight ranges.

26. The method of claim 19, wherein the silicone resin is polydimethoxysiloxane.

27. The method of claim 23, wherein the coating comprises in the range of from about 0.1 wt % to about 20 wt % boron nitride.

28. The method of claim 27, wherein the coating comprises in the range of about 0.5 to about 5 wt % boron nitride.

29. The method of claim 21, wherein the coating comprises in the range of about 1 wt % to about 40 wt % silicone resin.

30. The method of claim 29, wherein the coating comprises in the range of about 8 wt % to about 20 wt % silicone resin.

31. The method of claim 23, wherein the coating comprises in the range of about 4 wt % to about 30 wt % of the at least one resin binder.

32. The method of claim 31, wherein the coating comprises in the range of about 4 wt % to about 20 wt % of the at least one resin binder.

33. An article coated with the composition of claim 2.

34. The article of claim 33, wherein the article coated comprises a weatherstrip, windshield wiper or automotive seal.

35. A flock replacement coating for glass run comprising the composition of claim 1.

36. An appearance coating for an outer belt comprising the composition of claim 1.

* * * * *

UNITED STATES PATENT AND TRADEMARK OFFICE
CERTIFICATE OF CORRECTION

PATENT NO. : 7,247,673 B2  Page 1 of 1
APPLICATION NO. : 10/783315
DATED : July 24, 2007
INVENTOR(S) : Michael W. Pinter and Marufur Rahim It is certified that error appears in the above-identified patent and that said Letters Patent is hereby corrected as shown below:

Title Page, insert: Related U.S. Application Data

(63) This application is a Continuation-in-Part of 10/427,074 filed April 30, 2003

Signed and Sealed this

Fourth Day of September, 2007

JON W. DUDAS
*Director of the United States Patent and Trademark Office*